(12) United States Patent
Cho et al.

(10) Patent No.: US 7,701,979 B2
(45) Date of Patent: Apr. 20, 2010

(54) RESIDENTIAL ETHERNET NODE APPARATUS FOR MAINTAINING STARTING POINT OF SUPERFRAME AND METHOD FOR PROCESSING SAME

(75) Inventors: Jae-Hun Cho, Seoul (KR); Sang-Ho Kim, Hwaseong-si (KR); Yun-Je Oh, Yongin-si (KR); Jong-Ho Yoon, Goyang-si (KR); Han-Kyun Jung, Goyang-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 944 days.

(21) Appl. No.: 11/444,786

(22) Filed: Jun. 1, 2006

(65) Prior Publication Data

US 2006/0274754 A1 Dec. 7, 2006

(30) Foreign Application Priority Data

Jun. 1, 2005 (KR) ...................... 10-2005-0046912

(51) Int. Cl.
*H04J 3/06* (2006.01)
(52) U.S. Cl. ...................... 370/503; 370/509; 370/510
(58) Field of Classification Search ................ 370/389, 370/392, 503, 509, 510, 528
See application file for complete search history.

(56) References Cited

U.S. PATENT DOCUMENTS 5,604,742 A * 2/1997 Colmant et al. ............. 370/396

2003/0152059 A1* 8/2003 Odman ....................... 370/338
2005/0265332 A1* 12/2005 Lim et al. ................... 370/389
2006/0092844 A1* 5/2006 Jeon et al. ................... 370/235

* cited by examiner

Primary Examiner—Chi H Pham
Assistant Examiner—Farah Faroul
(74) Attorney, Agent, or Firm—Cha & Reiter LLC

(57) ABSTRACT

Disclosed is a Residential Ethernet node apparatus for maintaining a starting point of a superframe, the Residential Ethernet node apparatus comprising a synchronous queue for receiving and temporarily storing synchronous data, in order to transmit the synchronous data by inserting the synchronous data into a transmission cycle, a parser for receiving asynchronous frames from at least one exterior source, parsing the asynchronous frames according to characteristics of the asynchronous frames, a plurality of the asynchronous queues for separately storing the asynchronous frames received from the parser according to the characteristics of the asynchronous frames, a scheduler for receiving the asynchronous frames from the asynchronous queues, and transmitting the received asynchronous frame when it is possible to transmit the received asynchronous frame, and a multiplexer, which receives a synchronous frame from the synchronous queue and an asynchronous frame from the scheduler so as to transmit the synchronous frame and asynchronous frame in a form of a transmission cycle while maintaining a starting point of a superframe.

15 Claims, 12 Drawing Sheets

RESIDENTIAL ETHERNET NODE APPARATUS FOR MAINTAINING STARTING POINT OF SUPERFRAME AND METHOD FOR PROCESSING SAME

CLAIM OF PRIORITY

This application claims the benefit under 35 U.S.C. 119(a) to that patent application entitled "Residential Ethernet Node Apparatus For Strictly Maintaining Starting Point Of Superframe And Method For Processing The Same Frame," filed in the Korean Intellectual Property Office on Jun. 1, 2005 and assigned Ser. No. 2005-46912, the entire contents of which are incorporated herein by reference.

BACKGROUND OF THE INVENTION

1. Field of the Invention

The present invention relates to Residential Ethernet capable of simultaneously and efficiently providing real time service and non-real time service using Ethernet, and more particularly to a method for maintaining the starting point of a superframe in Residential Ethernet.

2. Description of the Related Art

Ethernet is the most widely used local area network technology and is now defined as a standard in an Institute Electrical of Electrical and Electronics Engineers (IEEE) 802.3. Ethernet has been originally developed by Xerox and has been advanced by technology companies such as Xerox, Digital Equipment Corporation (DEC), Intel, etc.

The Ethernet is a technology generally used when data is transmitted among a plurality of terminals or users. In conventional Ethernet competitive access is accomplished by means of a carrier sense multiple access/collision detect (CSMA/CD) protocol stipulated in the IEEE 802.3 standard. Typically a service frame of an upper layer is converted to an Ethernet frame while maintaining an inter frame gap (IFG), and the Ethernet frame is then transmitted. The Upper service frames are transmitted according to the creation sequence, regardless of the frame type.

Such conventional Ethernet has been known to be insufficient for transmitting a moving picture or voice data because of transmission delays. However, recently, various forms of research is being actively conducted to develop technology for transmitting synchronous data, such as image/voice data, by using the existing Ethernet. Such an Ethernet for transmitting synchronous data, which is currently under discussion, is referred to as "Residential Ethernet".

In Residential Ethernet, frames are transmitted in a cycle unit, and generally, one cycle is defined as 125 μsec. One transmission cycle is divided into a synchronous section for transmitting synchronous frames and an asynchronous section for transmitting asynchronous frames. Herein, the synchronous frames refer to Ethernet frames having a fixed length, and the asynchronous frames refer to Ethernet frames having variable lengths.

Current Residential Ethernet restricts the maximum number of synchronous frames to sixteen in one superframe so that at least one asynchronous frame can be transmitted during the asynchronous section of the superframe. A maximum of 2153 bytes can be transmitted during the asynchronous section of the superframe.

FIG. 1 is a view illustrating the structure of a transmission cycle in Residential Ethernet.

The Residential Ethernet currently being discussed has a transmission cycle 10 of 125 μsec for data transmission, and each transmission cycle includes an asynchronous frame section 110 for transmission of asynchronous data and a synchronous frame section 100 for transmission of synchronous data.

More specifically, the synchronous frame section 100 for transmission of synchronous data has the highest priority in the transmission cycle, and includes 738-byte sub-synchronous frames 101, 102, and 103 according to a proposal under current discussion.

In addition, the asynchronous frame section 110 for transmission of the asynchronous data includes sub-asynchronous frames 111, 112, and 113 having various lengths in each corresponding area.

As shown in FIG. 1, it is necessary in Residential Ethernet to maintain an exact cycle because transmission is performed based on a cycle. However, it is difficult to maintain an exact cycle in Residential Ethernet because asynchronous frames have various lengths.

FIG. 2 is a view for explaining a case in which synchronization is not achieved due to asynchronous frames in Residential Ethernet.

Referring to FIG. 2, cycles 21, 22, and 23 include synchronous frames 201, 202, 203, 207, 208, 209, 212, and 213 and asynchronous frames 204, 205, 206, 210, and 211, all of which are transmitted.

The Residential Ethernet transmits synchronous data in synchronization with starting points of the cycles 21, 22, and 23. However, in FIG. 2, the synchronization of the cycles is disrupted due to the asynchronous frame 206 of the $N^{th}$ cycle 21. Accordingly, the starting point of the $(N+1)^{th}$ cycle 22 is delayed by $\Delta t_1$ 214, and the starting point of the $(N+2)^{th}$ cycle 23 is delayed by $\Delta t_2$ 215. As described above, since asynchronous frames have various lengths, it is difficult to insert the asynchronous frames into every cycle to correspond exactly to the size of each cycle, it is difficult to achieve an exact synchronization of the frames.

Such a delay phenomenon in the start of a superframe occurs more frequently as the amount of asynchronous traffic becomes larger, and a delay time period becomes longer as the length of a transmitted asynchronous frame becomes longer.

As described above, the Residential Ethernet has a problem in that an asynchronous frame transmitted in an asynchronous section may cause delay in the starting point of the next superframe, and at the worst, a cycle may be delayed during a transmission time period for a maximum of 1518 bytes. Particularly, such delay may reduce the synchronous section of the next superframe.

In order to solve these problems, a hold scheme, a fragmentation scheme, and a RUNT scheme have been proposed. According to the hold scheme, when it is impossible to transmit an asynchronous frame within a transmission region of a cycle, the corresponding transmission region remains empty, and the data of the asynchronous frame is transmitted in the next cycle. According to the fragmentation scheme, when it is impossible to transmit an asynchronous frame within a transmission region of a cycle, the asynchronous frame is fragmented so as to include an asynchronous frame piece suitable to the corresponding transmission region, and the remaining pieces of the asynchronous frame are transmitted in the next cycle. According to the RUNT scheme, which is executed without consideration of transmission regions, if a new cycle starts while an asynchronous frame is being transmitted, the transmission of the corresponding asynchronous frame is stopped, and the corresponding asynchronous frame is again transmitted at the beginning of the asynchronous section in the next cycle.

The hold scheme among these schemes will now be described in more detail with reference to FIG. 3.

FIG. 3 is a view illustrating the structure of a transmission cycle based on the hold scheme for strict synchronization in Residential Ethernet.

Cycles 31, 32, and 33 include synchronous frames 301, 302, 303, 306, 307, 308, 310, 311, and 312 and asynchronous frames 204, 205, and 309, which are transmitted.

Referring to FIG. 3, it can be understood that synchronization for the starting point of each transmission cycle is achieved, differently from transmission cycles shown in FIG. 2. Such synchronization is achieved by controlling the transmission of asynchronous frames. In detail, in the case of the $N^{th}$ cycle 31, there is an available transmission region in the $N^{th}$ cycle 31 after the asynchronous frame 305 has been transmitted, but the available transmission region is smaller than the size of the next asynchronous frame 309. In this case, the transmission is controlled such that the available transmission region is left empty and the next asynchronous frame 309 is transmitted in the next cycle $(N+1)^{th}$ cycle 32, so that synchronization can be strictly maintained.

As described above, according to the hold scheme, when it is determined through comparison that the size of an asynchronous frame "A" is larger than the size of an available asynchronous-frame transmission region "B" in a transmission cycle, the transmission cycle is transmitted with the available transmission region "B" left empty, and the asynchronous frame "A" is transmitted in the next cycle.

However, the above hold scheme is illustrated only with respect to a case in which one Residential Ethernet node transmits asynchronous frames sent from one asynchronous device. Therefore, if it is assumed that an Residential Ethernet node transmits asynchronous frames sent from a plurality of asynchronous devices, the construction and operation of the Residential Ethernet node will differ from those described with reference to FIG. 3.

FIG. 4 is a block diagram illustrating the construction of a Residential Ethernet node to which the hold scheme for strict synchronization is applied.

The Residential Ethernet node 41, to which the hold scheme for strict synchronization is applied, includes a synchronous queue 401, an asynchronous queue 402, and a multiplexer 403. The synchronous queue 401 receives and temporarily stores synchronous data, so as to transmit the synchronous data by inserting the synchronous data into a cycle. The asynchronous queue 402 receives asynchronous frames from different legacy LAN devices 42 and 43 and temporarily stores the asynchronous frames, so as to transmit the asynchronous frames by inserting the asynchronous frames into a cycle. The multiplexer 403 receives synchronous frames and asynchronous frames from the synchronous queue 401 and asynchronous queue 402, and transmits the synchronous frames and asynchronous frames in a form of a transmission cycle.

Herein, the asynchronous frames are received from the legacy LAN devices 42 and 43 and are stored in the asynchronous queue 402. That is, asynchronous frames 411 and 412 transmitted from the first legacy LAN device 42 and asynchronous frames 421 and 422 transmitted from the second legacy LAN device 43 are stored in the asynchronous queue 402.

When the hold scheme is employed, the first-stored 1-1 asynchronous frame 411 must be primarily transmitted and then secondly-stored 2-1 asynchronous frame 421 must be transmitted during a first/next transmission cycle. However, when the size of an available transmission region remaining after the first-stored 1-1 asynchronous frame 411 is smaller than that of the secondly-stored 2-1 asynchronous frame 421, the remaining transmission region is left empty, and the secondly-stored 2-1 asynchronous frame 421 is transmitted in the next transmission cycle.

Such a transmission method is efficient when the same type of asynchronous frames (i.e. asynchronous frames having the same destination address and the same source address) are transmitted, because it is necessary to sequentially transmit all the asynchronous frames. However, there exists a need to develop a new transmission method which can actively reduce such a waste of bandwidth when different types of asynchronous frames having different destination addresses or different source addresses are transmitted.

SUMMARY OF THE INVENTION

The present invention provides a Residential Ethernet node apparatus and method for processing asynchronous frames, which can reduce the waste of bandwidth by efficiently transmitting the asynchronous frames received from a plurality of asynchronous devices in a Residential Ethernet that employs a hold scheme for maintaining the starting point of a superframe.

In accordance with one aspect of the present invention, there is provided a Residential Ethernet node apparatus for maintaining a starting point of a superframe, the Residential Ethernet node apparatus comprising a synchronous queue for receiving and temporarily storing synchronous data, in order to transmit the synchronous data by inserting the synchronous data into a transmission cycle, a parser for receiving asynchronous frames from at least one exterior source, parsing the asynchronous frames according to characteristics of the asynchronous frames, a plurality of the asynchronous queues for separately storing the asynchronous frames received from the parser according to the characteristics of the asynchronous frames, a scheduler for receiving the asynchronous frames from the asynchronous queues, and transmitting the received asynchronous frame when it is possible to transmit the received asynchronous frame, and a multiplexer, which receives a synchronous frame from the synchronous queue and an asynchronous frame from the scheduler so as to transmit the synchronous frame and asynchronous frame in a form of a transmission cycle while strictly maintaining a starting point of a superframe.

In accordance with another aspect of the present invention, there is provided a Residential Ethernet node apparatus for maintaining a starting point of a superframe, the Residential Ethernet node apparatus comprising a synchronous queue for receiving and temporarily storing synchronous data, in order to transmit the synchronous data by inserting the synchronous data into a transmission cycle, an asynchronous queue for receiving and storing asynchronous frames from exterior sources, a dispatcher searching for the asynchronous frames in the asynchronous queue, and outputting an asynchronous frame which can be transmitted according to a size of an available transmission region, and a multiplexer, which receives a synchronous frame and an asynchronous frame from the synchronous queue and the dispatcher, respectively, so as to transmit the synchronous frame and asynchronous frame in a form of a transmission cycle while maintaining a starting point of a superframe.

In accordance with still another aspect of the present invention, there is provided a method for processing an asynchronous frame in a Residential Ethernet node apparatus which maintains a starting point of a superframe, the method comprising the steps of receiving asynchronous frames from a plurality of exterior sources, parsing the received asynchronous frames, and separately storing the parsed asynchronous frames in a plurality of queues according to characteristics of the parsed asynchronous frames, receiving information about a size of each asynchronous frame to be first transmitted from the queues one by one, comparing the received size information with an available transmission region, and transmitting asynchronous frames which can be transmitted, creating transmission failure information with respect to a queue for an asynchronous frame of which cannot be transmitted, and informing that there is no asynchronous frame to be transmitted in a corresponding transmission cycle, when transmission failure information has been created with respect to each queue.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
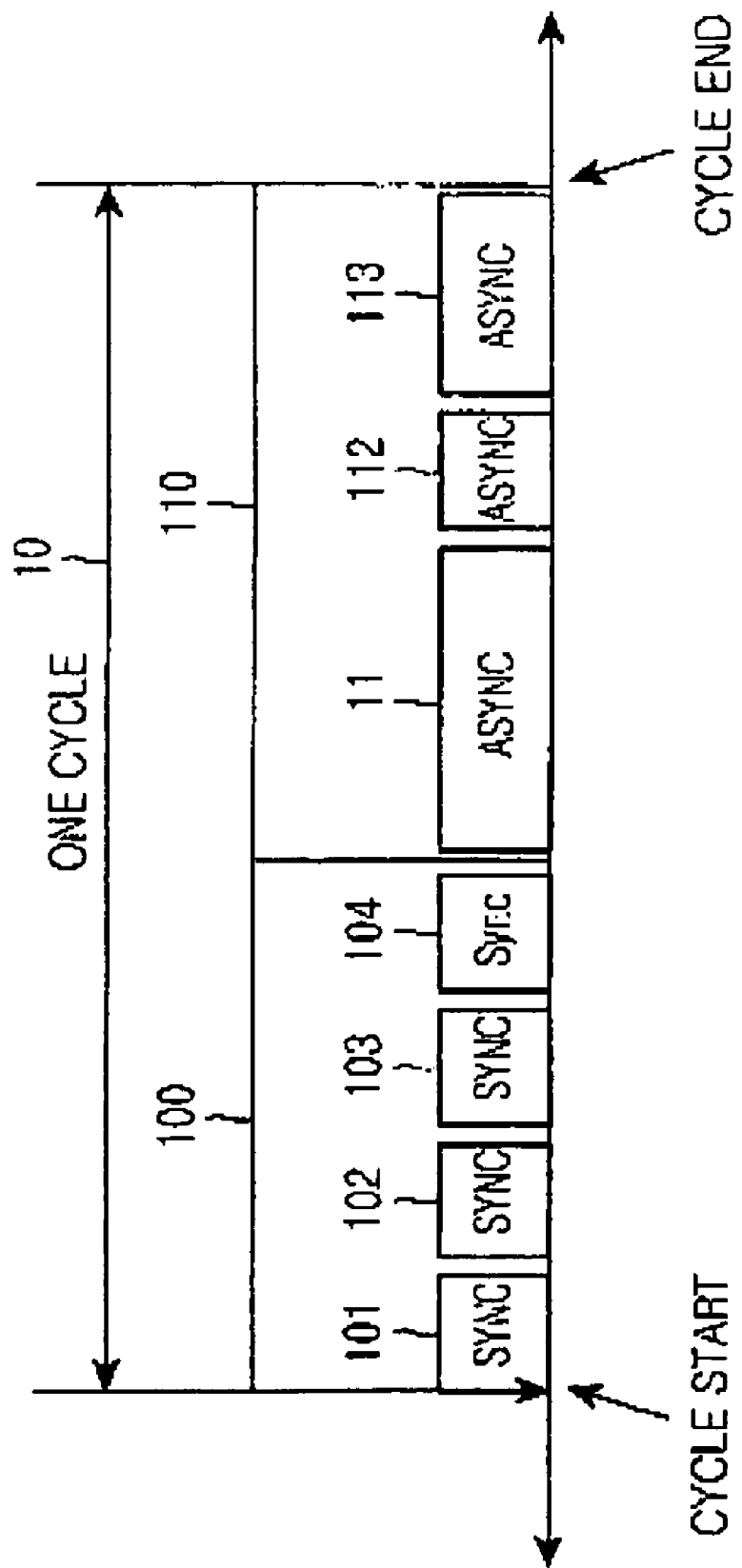
FIG. 1 is a view illustrating the structure of a transmission cycle in Residential Ethernet.
Figure 2:
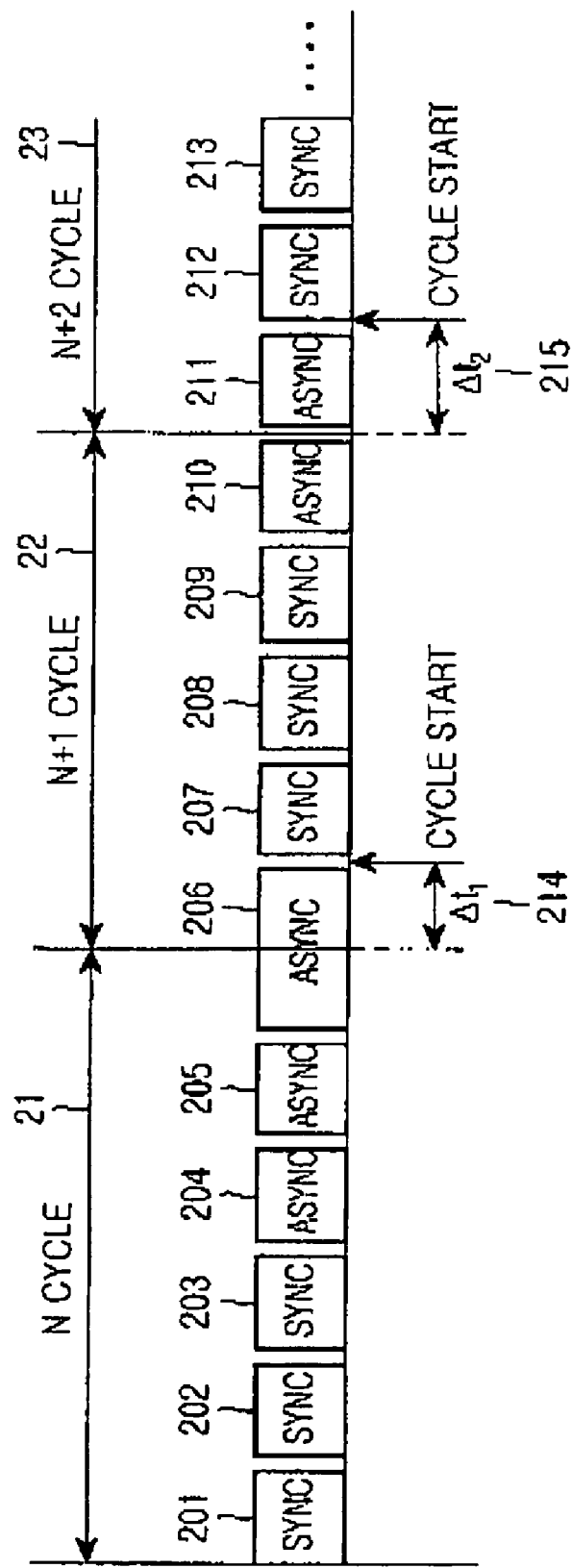
FIG. 2 is a view for explaining a case in which synchronization is not achieved due to asynchronous frames in Residential Ethernet.
Figure 3:
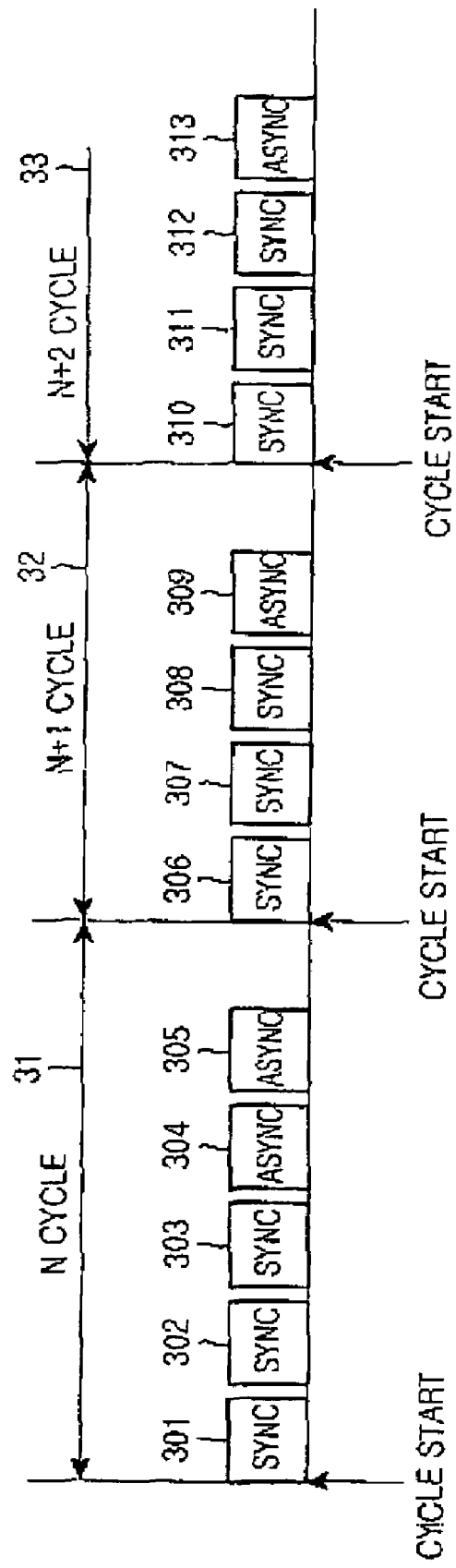
FIG. 3 is a view illustrating the structure of a transmission cycle based on the hold scheme for strict synchronization in Residential Ethernet.
Figure 4:
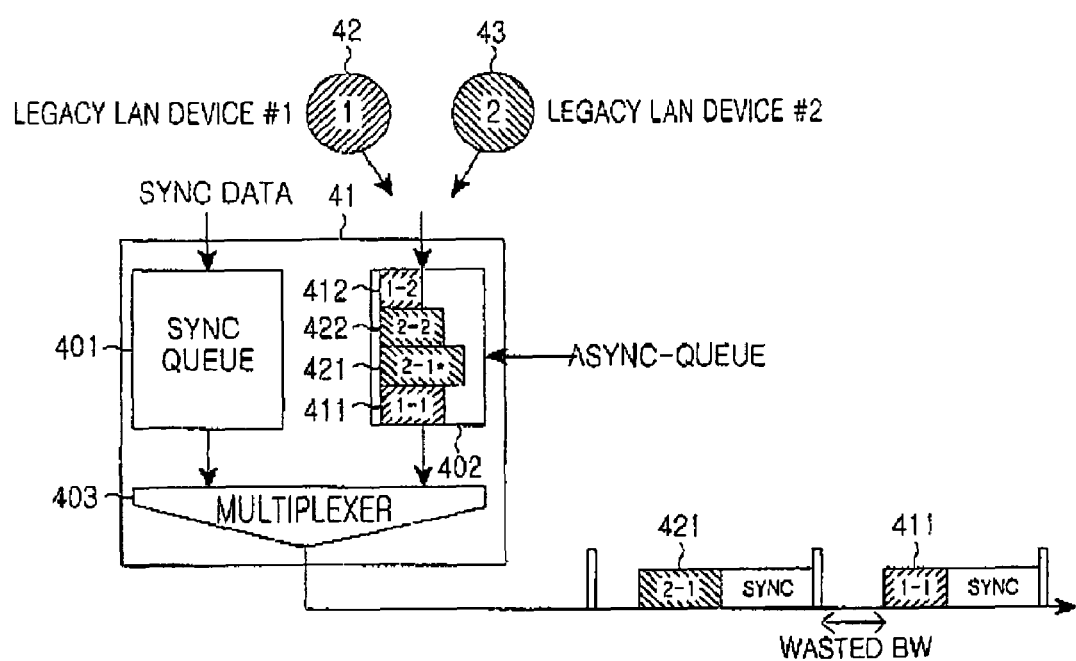
FIG. 4 is a block diagram illustrating the construction of a Residential Ethernet node, to which the hold scheme for strict synchronization is applied.

Hereinafter, embodiments of the present invention will be described with reference to the accompanying drawings. It is to be noted that the same elements are indicated with the same reference numerals throughout the drawings. For the purposes of clarity and simplicity, a detailed description of known functions and configurations incorporated herein will be omitted as it may obscure the subject matter of the present invention.

Although asynchronous frames must be distinguished from each other by using different queues depending on source addresses (SAs) and destination addresses (DAs), it is assumed that the asynchronous frames have the same destination address for convenience of description in the following embodiments of the present invention. Therefore, although asynchronous frames are distinguished from each other depending on only SAs in the below drawings and description, it will be understood by those skilled in the art that the present invention is not to be limited by this aspect of the drawings and description.

Figure 5:
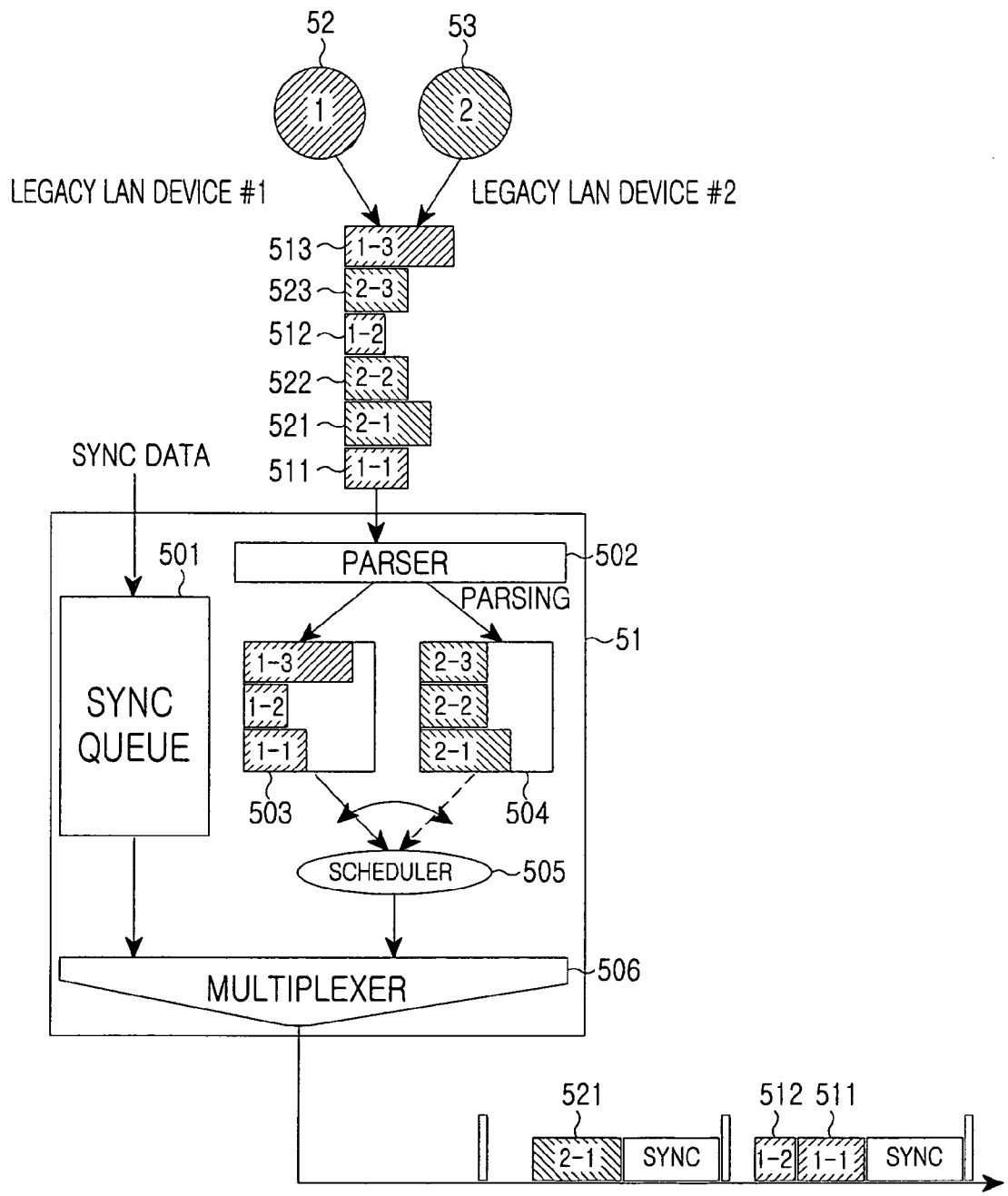
FIG. 5 is a block diagram illustrating the construction of a Residential Ethernet node, to which a hold scheme for synchronization is applied, according to a first embodiment of the present invention.

FIG. 5 is a block diagram illustrating the construction of a Residential Ethernet node, to which a hold scheme for synchronization is applied, according to a first embodiment of the present invention.

The Residential Ethernet node 51, to which the hold scheme for synchronization is applied, includes a synchronous queue 501, a parser 502, first and second asynchronous queues 503 and 504, a scheduler 505, and a multiplexer 506. The synchronous queue 501 receives and temporarily stores synchronous data, so as to transmit the synchronous data by inserting the synchronous data into a transmission cycle. The parser 502 receives asynchronous frames from different legacy LAN devices 52 and 53, and parses the asynchronous frames so as to separately transmit the asynchronous frames according to the destination addresses (DAs) and source addresses (SAs) thereof. Each of the first and second asynchronous queues 503 and 504 stores asynchronous frames having the same DA and SA, which have been divided by the parser 502. The scheduler 505 receives asynchronous frames from the first and second asynchronous queues 503 and 504, and transmits the received asynchronous frame when it is possible to transmit the received asynchronous frame. In one aspect, the scheduler 505 receives asynchronous frames from the first and second queues 504 and 504 alternatively from the queues and sequentially within the queues. The multiplexer 506 receives synchronous frames and asynchronous frames from the synchronous queue 501 and scheduler 505, and transmits the synchronous frames and asynchronous frames in a form of a transmission cycle.

As shown in FIG. 5, the Residential Ethernet node 51, to which the hold scheme for synchronization is applied according to the present invention, parses asynchronous frames and separately stores the asynchronous frames based on the DAs and SAs thereof, so that the two-way searching methods can be used to search for asynchronous frames to be accommodated in an available transmission region of a transmission cycle.

That is, according to the conventional hold scheme, in which asynchronous frames are accommodated in a transmission cycle according to the input sequence thereof, when an available transmission region of a transmission cycle is smaller than the size of a second asynchronous frame after a first asynchronous frame has been accommodated in the transmission cycle, the transmission cycle is transmitted with an available transmission region left empty. However, according to a two-way searching method of the present invention, after a first asynchronous frame has been accommodated in a transmission cycle, information about a first asynchronous frame from each of the different asynchronous queues, which store asynchronous frames having a different characteristic (i.e. different SA or DA) from that of the first asynchronous frame, is received and checked to determine whether each received asynchronous frame can be transmitted (a first-way search), and also information about the asynchronous frames, which have the same characteristics (i.e. the same SA and DA) as those of the first asynchronous frame, are received and checked to determine whether each received asynchronous frame can be transmitted in the transmission cycle (a second-way search).

According to such a two-way searching method for asynchronous frames, all asynchronous queues are searched first so as to check if there is an asynchronous frame that can be transmitted in a corresponding transmission cycle. The search method is performed in such a manner that a first asynchronous queue is searched, information about the searched asynchronous queue is stored when there is no asynchronous frame therein capable of being transmitted, and then the next asynchronous queue is searched in the same manner. That is, according to the present invention, a horizontal search is performed across the asynchronous queues and a vertical search performed within each asynchronous queue are realized by a single method.

Therefore, the hold scheme according to the present invention can efficiently prevent a transmission region from being wasted, as compared with the conventional hold scheme. That is, according to the conventional hold scheme, after a first asynchronous frame has been transmitted in the transmission cycle, the procedure ends without searching for any other frame if a second asynchronous frame cannot be transmitted in a transmission cycle. In contrast, according to the scheme of the present invention, after a first asynchronous frame has been accommodated in the transmission cycle, the queues are checked in various ways to determine whether there is another asynchronous frame capable of being accommodated in a transmission cycle, thereby minimizing the waste of bandwidth.

Figure 6:
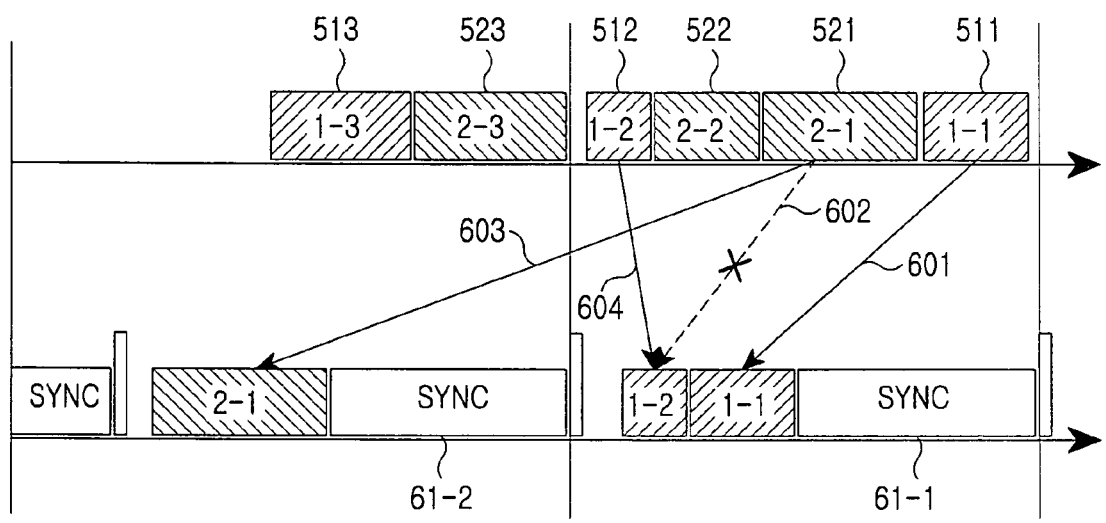
FIG. 6 is a view explaining a method for processing asynchronous frames of a plurality of asynchronous queues in a Residential Ethernet node, to which the hold scheme for synchronization is applied, according to a first embodiment of the present invention.

FIG. 6 is a view explaining an exemplary method for processing asynchronous frames of a plurality of asynchronous queues in a Residential Ethernet node, to which the hold scheme for synchronization is applied, according to a first embodiment of the present invention.

FIG. 6 is a detailed view illustrating the transmission of asynchronous frames which are shown in FIG. 5. In other words, FIG. 6 shows how to process a plurality of asynchronous frames 511, 512, 513, 521, 522, and 523, which are to be transmitted in a transmission cycle, so that the starting point of each superframe can be maintained and the waste of bandwidth is minimized.

Herein, the description about synchronous frames 61-1 and 61-2 will be omitted.

The asynchronous frames 511, 512, 513, 521, 522, and 523, which have been input to the Residential Ethernet node 51 according to the present invention, are separately stored according to DAs and SAs.

The asynchronous frames 511, 512, and 513 are stored in a first asynchronous queue 503, and the asynchronous frames 521, 522, and 523 are stored in a second asynchronous queue 504.

Thereafter, when a first asynchronous frame 511 has been accommodated in a transmission cycle (see reference number "601"), it is necessary to find another asynchronous frame to be accommodated in the remaining available asynchronous-frame transmission region of the corresponding transmission cycle. Since a second asynchronous frame 521 is too large to be accommodated in the available asynchronous-frame transmission region (see reference number "602"), the asynchronous frame 621 is transmitted in the next transmission cycle (see reference number "603").

Therefore, different asynchronous frames are searched for in order to find an appropriate asynchronous frame. Although a third asynchronous frame 522 has an appropriate size to be accommodated in the available asynchronous-frame transmission region, the third asynchronous frame 522 cannot be transmitted before the second asynchronous frame 521 because asynchronous frames included in the same asynchronous queue 503 or 504 must be sequentially transmitted, so that the third asynchronous frame 521 cannot also be accommodated in the available asynchronous-frame transmission region. Therefore, a fourth asynchronous frame 512 is checked. Since the fourth asynchronous frame 512 has an appropriate size to be accommodated in the available transmission region and there is no frame before the fourth asynchronous frame 512 in the asynchronous queue 503, the fourth asynchronous frame 512 can be accommodated in the available transmission region so as to be transmitted (see reference number "604").

The transmission of asynchronous frames will now be described in more detail with reference to FIGS. 5 and 6.

Asynchronous frames, having been received from different sources 52 and 53, are parsed, are divided based on the DAs and SAs thereof, and are separately stored in the first and second queues 503 and 504 according to the characteristics (i.e. the DAs and SAs) of the asynchronous frames.

Then, the asynchronous frames, having been stored in the first and second asynchronous queues 503 and 504 are alternately checked by the scheduler 505 so as to be accommodated in a transmission cycle, which are performed as follows.

First, after a first output asynchronous frame 511 of the first asynchronous queue 503 has been accommodated in a transmission cycle, a shifting operation is performed into the next asynchronous frame 504, and it is checked whether a first output asynchronous frame 521 of the next asynchronous queue 504 can be transmitted in the transmission cycle. Then, when it is determined that the first output asynchronous frame 521 of the next asynchronous queue 504 cannot be transmitted in the transmission cycle, it is necessary to shift to the next asynchronous queue. However, the shift to the next asynchronous queue ends, because the present invention provides only two devices in this embodiment. In addition, when the shift between asynchronous queues has ended, the first asynchronous queue 503 is again checked in order to determine if an asynchronous frame included in the first asynchronous queue 503 can be transmitted in the transmission cycle. That is, it is determined if a second output asynchronous frame 512, which corresponds to the asynchronous frame next to the first output asynchronous frame 511, can be accommodated in the transmission cycle, and then the second output asynchronous frame 512 is accommodated in the transmission cycle if it is possible.

In this case, frame transmission in the next cycle starts from the first output asynchronous frame 521 of the second asynchronous queue 504. This is because scheduling information is established in the scheduler 505 such that transmission for transmittable asynchronous frames is achieved in the next cycle according to the sequence of asynchronous queues which have failed the transmission of the transmittable asynchronous frames.

Figure 7:
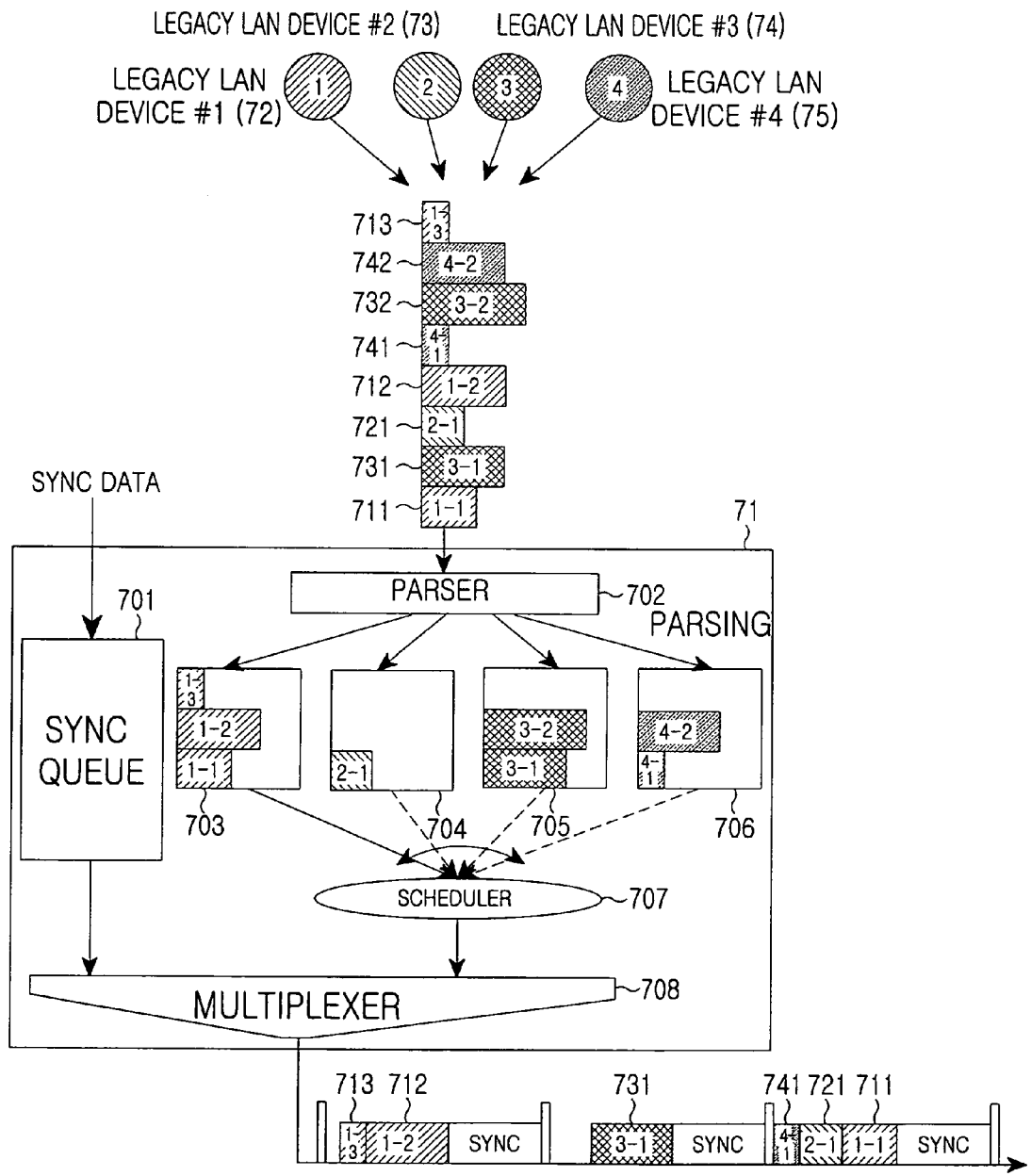
FIG. 7 is a block diagram illustrating the construction of a Residential Ethernet node, to which the hold scheme for synchronization is applied, according to a second embodiment of the present invention.

FIG. 7 is a block diagram illustrating the construction of a Residential Ethernet node, to which the hold scheme for synchronization is applied, according to a second embodiment of the present invention.

FIG. 7 shows the construction of the Residential Ethernet node, to which the hold scheme for synchronization is applied and which receives asynchronous frames from four legacy LAN devices, according to this second embodiment of the present invention.

The Residential Ethernet node 71, to which the hold scheme for strict synchronization is applied, includes a synchronous queue 701, a parser 702, first to fourth asynchronous queues 703 to 706, a scheduler 707, and a multiplexer 708. The synchronous queue 701 receives and temporarily stores synchronous data, so as to transmit the synchronous data by inserting the synchronous data into a transmission cycle. The parser 702 receives asynchronous frames from different legacy LAN devices 72, 73, 74 and 75, and parses the asynchronous frames so as to separately transmit the asynchronous frames according to the destination addresses (DAs) and source addresses (SAs) thereof. Each of the first to fourth asynchronous queues 703 to 706 stores asynchronous frames having the same DA and SA, which have been divided by the parser 702. The scheduler 707 sequentially receives asynchronous frames from the first to fourth asynchronous queues 703 to 706, and transmits the received asynchronous frame when it is possible to transmit the received asynchronous frame. The multiplexer 708 receives synchronous frames and asynchronous frames from the synchronous queue 701 and scheduler 707, and transmits the synchronous frames and asynchronous frames in a form of a transmission cycle.

Figure 8:
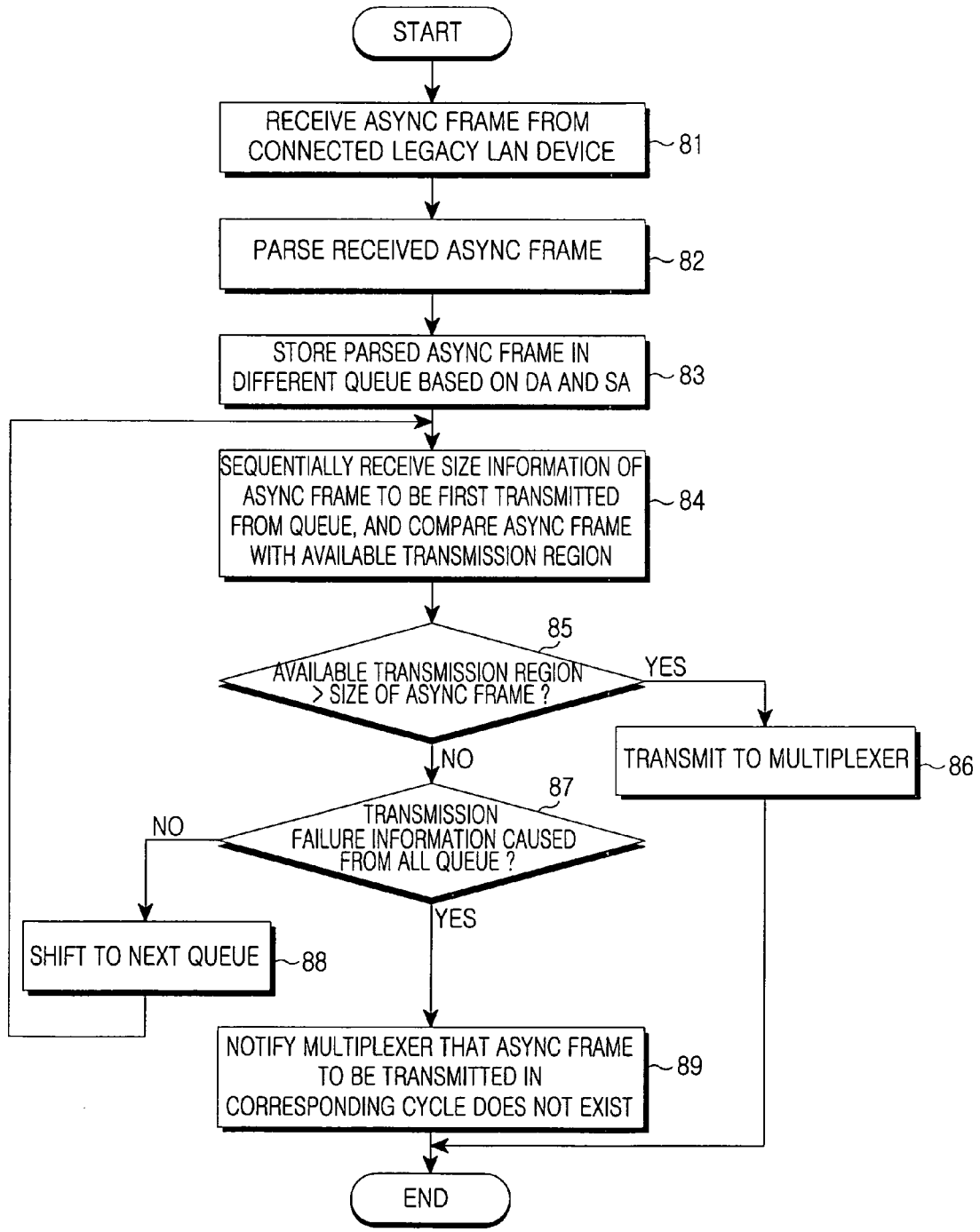
FIG. 8 is a flowchart illustrating a frame processing method for minimizing the waste of transmission bandwidth when a plurality of asynchronous frames are input to the Residential Ethernet node, to which the hold scheme for synchronization is applied according to an embodiment of the present invention.

FIG. 8 is a flowchart illustrating a frame processing method for minimizing the waste of transmission bandwidth when a plurality of asynchronous frames are input to the Residential Ethernet node, to which the hold scheme for synchronization is applied according to an embodiment of the present invention.

First, in step 81, the Residential Ethernet node, to which the hold scheme for strict synchronization is applied according to the present invention, receives asynchronous frames from a plurality of legacy LAN devices, which are connected with the Residential Ethernet node.

The received asynchronous frames are parsed in step 82, and the parsed asynchronous frames are separately stored in different queues depending on the characteristics of the asynchronous frames in step 83. Herein, the characteristics of each asynchronous frame refers to the DA and SA of the asynchronous frame.

Then, the scheduler receives information about the size of each asynchronous frame to be first transmitted from queues in turn, and compares the size of the asynchronous frame with the size of an available transmission region (step 84).

When the size of the asynchronous frame, which has been input to the scheduler, is equal to or smaller than the available transmission region (step 85), the scheduler transmits the corresponding asynchronous frame to the multiplexer (step 86) so as to be accommodated in a corresponding transmission cycle.

In contrast, when the size of the asynchronous frame, which has been input to the scheduler, is larger than the available transmission region (step 85), the scheduler checks if transmission failure information has been received from all queues (step 87). When it is determined in step 87 that transmission failure information has not been received from all queues, the scheduler receives the transmission failure information from the corresponding queue, shifts to a next queue (step 88), and then returns to step 84.

In contrast, when it is determined in step 87 that transmission failure information has been received from all queues, the scheduler notifies the multiplexer that there is no asynchronous frame to be transmitted in the corresponding transmission cycle (step 89) so that the corresponding transmission cycle can be established with a corresponding transmission region left empty.

Steps 84 to 87 will now be described in more detail with reference to FIG. 7. First, the scheduler receives information about the size of the first asynchronous frame 711 of a first asynchronous queue 703 from the asynchronous queue 703, compares the size of the first asynchronous frame 711 with an available transmission region, determines that the first asynchronous frame 711 can be transmitted, and then transmits the first asynchronous frame 711 to the multiplexer 708, thereby accommodating the first asynchronous frame 711 in a first transmission cycle. Next, the scheduler receives information about the size of the first asynchronous frame 721 from the asynchronous queue 704, compares the size of the first asynchronous frame 721 with an available transmission region, determines that the first asynchronous frame 721 can be transmitted, and then transmits the first asynchronous frame 721 to the multiplexer 708, thereby accommodating the first asynchronous frame 721 of queue 704 in the first transmission cycle. Then, the scheduler receives information about the size of the first asynchronous frame 731 from the asynchronous queue 705, compares the size of the first asynchronous frame 731 with an available transmission region. When it is determined that the first asynchronous frame 731 cannot be transmitted, the scheduler creates transmission failure information, and shifts to the next asynchronous queue 706. The next transmission of asynchronous frames is scheduled by a sequence created by transmission failure information. Therefore, the first asynchronous frame of a second transmission cycle occurs beginning with frame 731 of asynchronous queue 705.

Next, the scheduler receives information about the size of the first asynchronous frame 741 of a next asynchronous queue 706 from the asynchronous queue 706, compares the size of the first asynchronous frame 741 with an available transmission region, determines that the first asynchronous frame 741 can be transmitted, and then transmits the first asynchronous frame 741 to the multiplexer 708, thereby accommodating the first asynchronous frame 741 in the first transmission cycle. Then, the scheduler receives information about the size of an asynchronous frame 712 to be transmitted from a next asynchronous queue 703, compares the size of the asynchronous frame 712 with an available transmission region. When it is determined that that the asynchronous frame 712 cannot be transmitted, the scheduler creates transmission failure information, and shifts to the next asynchronous queue 704. Then, since there is no asynchronous frame to be transmitted in the asynchronous queue 704, the scheduler creates transmission failure information and shifts to the next asynchronous queue 705. At this time, since the transmission failure information has already been created relative to the next asynchronous queue 705, the scheduler shifts to asynchronous queue 706.

Similarly, the scheduler receives information about the size of an asynchronous frame 742 to be transmitted from the asynchronous queue 706, compares the size of the asynchronous frame 742 with an available transmission region, determines that the asynchronous frame 742 cannot be transmitted, and creates transmission failure information for this frame. Thereafter, the scheduler must shift to a next asynchronous queue. However, since transmission failure information has been created with respect to all asynchronous queues, the scheduler notifies the multiplexer 708 that there is no asynchronous frame to be transmitted so that the corresponding transmission cycle can be established with a corresponding transmission region left empty.

Since the transmission sequence in the next transmission cycle ((N+1)$^{th}$ transmission cycle) is established according to the sequence of transmission failure information created by the scheduler in the current transmission cycle (N$^{th}$ transmission cycle), asynchronous frames are transmitted in the next transmission cycle in the sequence of frame 731 of asynchronous queue 705, frame 712 of asynchronous queue 703, a second asynchronous queue 704, and frame 742 of fourth asynchronous queue 706, etc.

Through such a procedure, even if a plurality of asynchronous queues exist, scheduling for asynchronous frames can be performed at a uniform rate for asynchronous queues.

Figure 9:
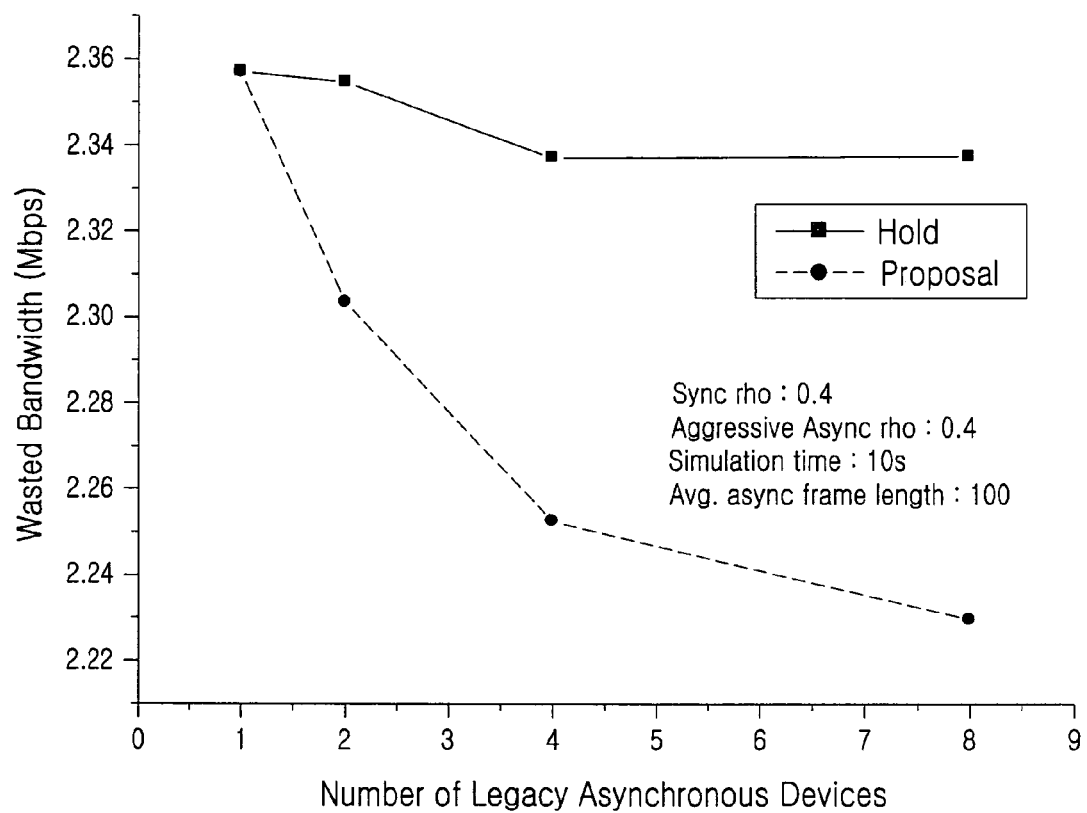
FIG. 9 is a graph illustrating a first simulation result obtained when asynchronous frames are transmitted according to an embodiment of the present invention.

FIG. 9 is a graph illustrating a first simulation result obtained when asynchronous frames are transmitted according to an embodiment of the present invention.

In FIG. 9, the lateral axis represents the number of legacy asynchronous devices connected to a Residential Ethernet node, and the longitudinal axis represents wasted bandwidth which is expressed in a unit of Mbps.

This simulation is performed under the conditions of the size of each asynchronous frame being randomly generated while the average size of the generated asynchronous frames is controlled to be 100 bytes.

Referring to FIG. 9, it can be understood that the hold scheme of the present invention can reduce wasted bandwidth by about 0.06 Mbps when two legacy asynchronous devices are connected to the Residential Ethernet node, and can reduce wasted bandwidth by about 0.11 Mbps when four legacy asynchronous devices are connected to the Residential Ethernet node, as compared with the conventional hold scheme.

Figure 10:
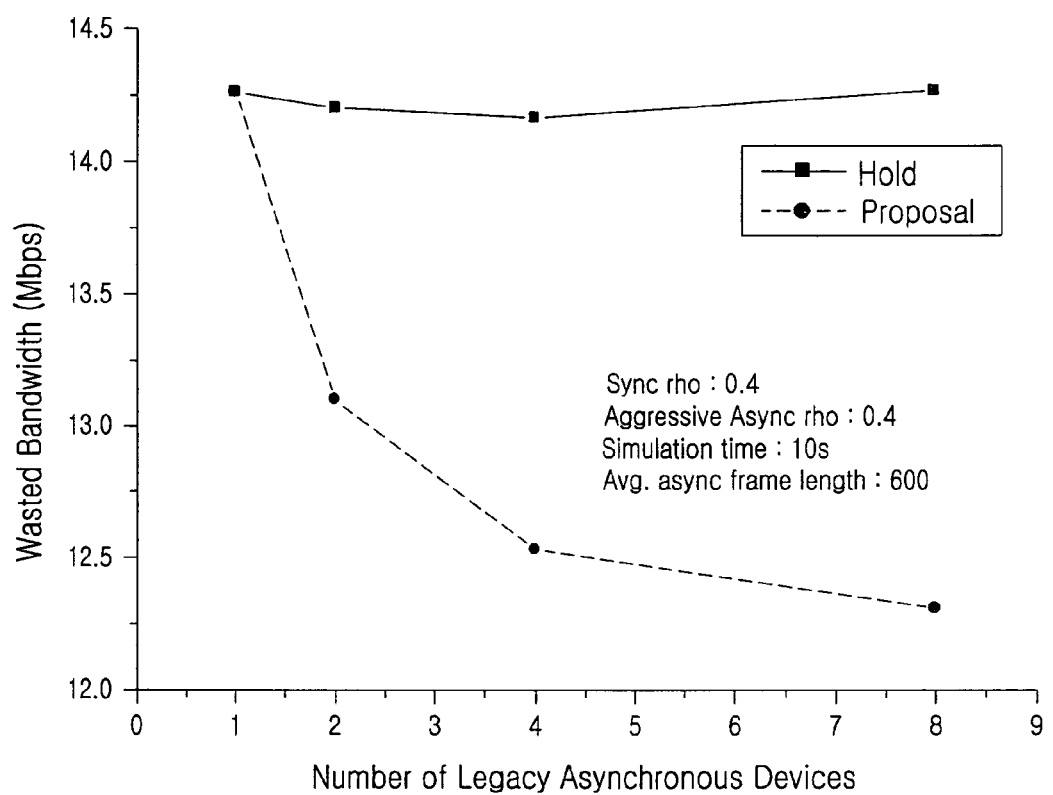
FIG. 10 is a graph illustrating a second simulation result obtained when asynchronous frames are transmitted according to an embodiment of the present invention.

FIG. 10 is a graph illustrating a second simulation result obtained when asynchronous frames are transmitted according to an embodiment of the present invention.

In FIG. 10, the lateral axis represents the number of legacy asynchronous devices connected to a Residential Ethernet node, and the longitudinal axis represents wasted bandwidth which is expressed in a unit of Mbps.

This simulation is performed under the conditions the size of each asynchronous frame being randomly generated while the average size of the generated asynchronous frames is controlled to be 600 bytes.

Referring to FIG. 10, it can be understood that the hold scheme of the present invention can reduce wasted bandwidth by about 1.4 Mbps when two legacy asynchronous devices are connected to the Residential Ethernet node, and can reduce wasted bandwidth by about 1.9 Mbps when four legacy asynchronous devices are connected to the Residential Ethernet node, as compared with the conventional hold scheme.

Figure 11:
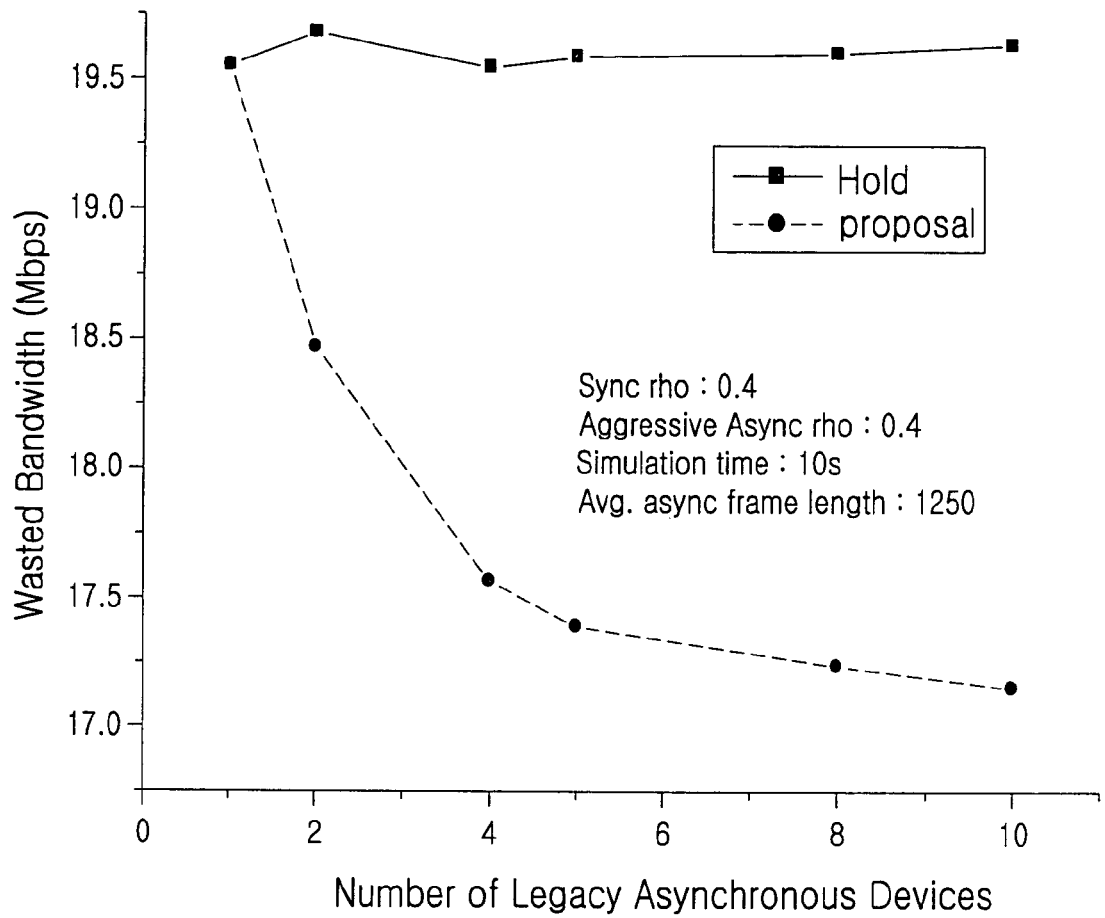
FIG. 11 is a graph illustrating a third simulation result obtained when asynchronous frames are transmitted according to an embodiment of the present invention.

FIG. 11 is a graph illustrating a third simulation result obtained when asynchronous frames are transmitted according to an embodiment of the present invention.

In FIG. 11, the lateral axis represents the number of legacy asynchronous devices connected to a Residential Ethernet node, and the longitudinal axis represents wasted bandwidth which is expressed in a unit of Mbps.

This simulation is performed under the conditions of the size of each asynchronous frame being randomly generated while the average size of the generated asynchronous frames is controlled to be 1250 bytes.

Referring to FIG. 11, it can be understood that the hold scheme of the present invention can reduce wasted bandwidth by about 1.2 Mbps when two legacy asynchronous devices are connected to the Residential Ethernet node, and can reduce bandwidth waste by about 2.0 Mbps when four legacy asynchronous devices are connected to the Residential Ethernet node, as compared with the conventional hold scheme.

As described with reference to FIGS. 9 to 11, it can be understood that the hold scheme according to the present invention can reduce wasted bandwidth by about 5% to 10%, as compared with the conventional hold scheme.

Figure 12:
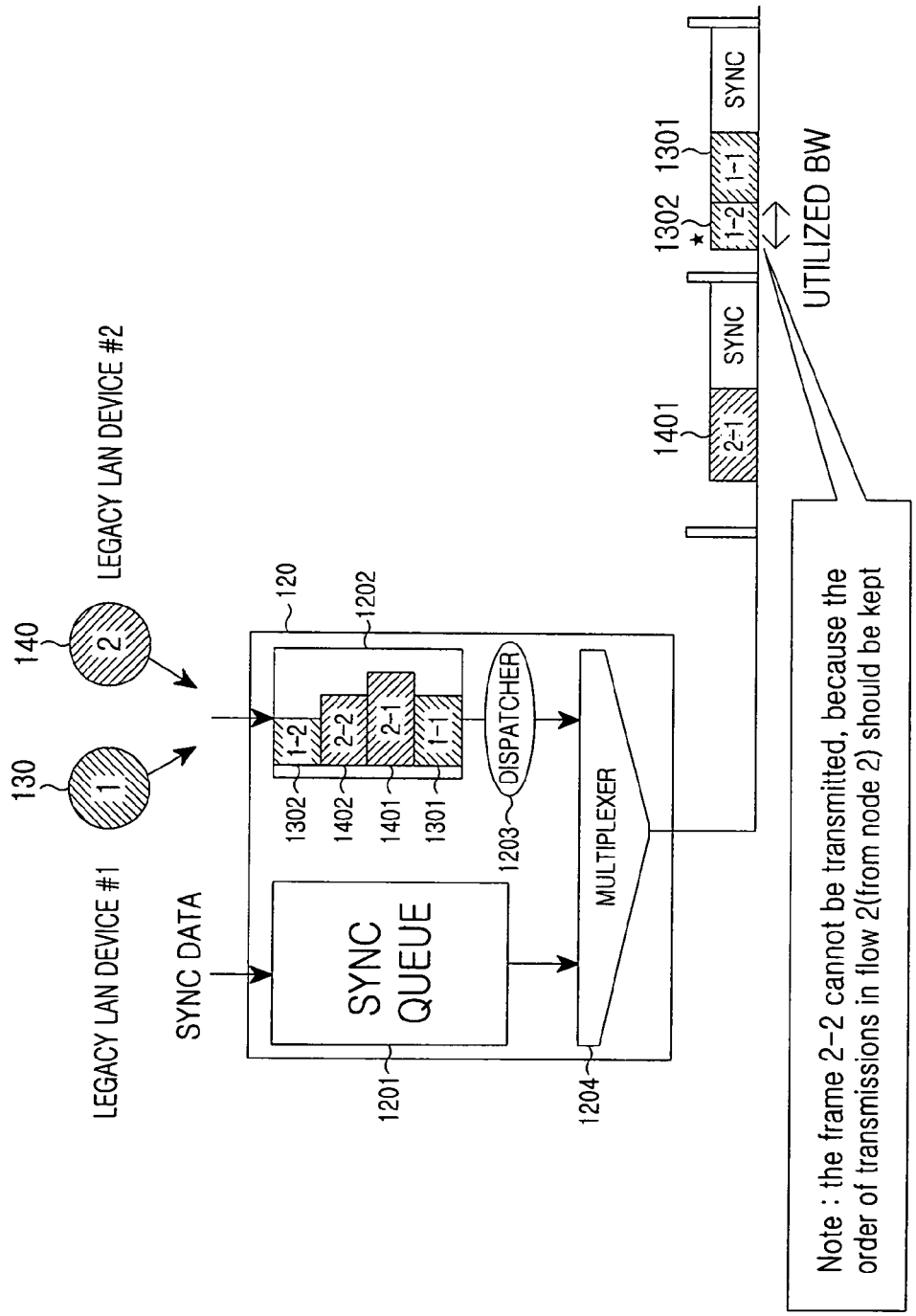
FIG. 12 is a block diagram illustrating the construction of a Residential Ethernet node, to which the hold scheme for synchronization is applied, according to a third embodiment of the present invention.

FIG. 12 is a block diagram illustrating the construction of a Residential Ethernet node, to which a hold scheme for synchronization is applied, according to a third embodiment of the present invention.

The Residential Ethernet node 120 includes a synchronous queue 1201, an asynchronous queue 1202, a dispatcher 1203, and a multiplexer 1204. The synchronous queue 1201 receives and temporarily stores synchronous data, so as to transmit the synchronous data by inserting the synchronous data into a transmission cycle. The asynchronous queue 1202 receives asynchronous frames from different legacy LAN devices 130 and 140, and stores the received asynchronous frames. The dispatcher 1203 sequentially checks asynchronous frames stored in the asynchronous queue 1202 according to the size of an available transmission region, and outputs an asynchronous frame which can be transmitted. The multiplexer 1204 receives synchronous frames and asynchronous frames from the synchronous queue 1201 and the dispatcher 1203, and transmits the synchronous frames and asynchronous frames in a form of a transmission cycle.

In the above description, the Residential Ethernet node apparatus for maintaining the starting point of each superframe according to the present invention is illustrated with respect to the case in which the operation of the Residential Ethernet node apparatus is controlled by a scheduler 505 or 707 with reference FIGS. 5 and 7, respectively. However, it is possible to use a controller, other than the schedulers 505 and 707, in order to control the Residential Ethernet node apparatus such that the Residential Ethernet node apparatus can process asynchronous frames according to the hold scheme of the present invention.

For instance, a controller, which is located between the multiplexer 506 or 708 and the scheduler 505 or 707, may receive information about the size of a region available for asynchronous frame transmission from the multiplexer, receive asynchronous frames through the scheduler 505 or 707, and perform a control operation such that each asynchronous frame is transmitted to the multiplexer 506 or 708 according to the size of the region. In addition, when it is impossible to transmit an asynchronous frame to the multiplexer 506 or 708, the controller creates transmission failure information, and performs a control operation such that the created transmission failure information can be used for scheduling thereafter.

According to the present invention as described above, when the Residential Ethernet node, which employs the hold scheme for maintaining the starting point of each superframe, receives asynchronous frames from a plurality of legacy asynchronous devices, the amount of bandwidth wasted is significantly reduced.

The above-mentioned methods and apparatus according to the present can be realized as software or computer code that can be stored in a recording medium such as a CD ROM, an RAM, a floppy disk, a hard disk, or a magneto-optical disk or downloaded over a network, so that the method described herein can be executed by such software using a computer or processor.

While the present invention has been shown and described with reference to certain preferred embodiments thereof, it will be understood by those skilled in the art that various changes in form and details may be made therein without departing from the spirit and scope of the invention as defined by the appended claims. For example, while the present invention has been described with regard to a plurality of queues, this represents a logical representation of the principles of the invention, wherein it would be understood that a single queue, properly segmented, may be used to store the parsed asynchronous frames. Accordingly, the scope of the invention is not to be limited by the above embodiments but by the claims and the equivalents thereof.

What is claimed is:

1. A Residential Ethernet node apparatus for maintaining a starting point of a superframe, comprising:
   a synchronous queue for receiving and temporarily storing synchronous data, in order to transmit the synchronous data by inserting the synchronous data into a transmission cycle;
   a parser for receiving asynchronous frames from at least one exterior source, parsing the asynchronous frames according to characteristics of the asynchronous frames;
   a plurality of the asynchronous queues for separately storing the asynchronous frames received from the parser according to the characteristics of the asynchronous frames, wherein each of the asynchronous queues having at least a first asynchronous frame for each respective characteristic parsed by the parser;
   a scheduler for receiving the asynchronous frames from the asynchronous queues, and for transmitting a particular received first asynchronous frame from a first asynchronous queue from the plurality of asynchronous queues when there is sufficient capacity to transmit the particular received first asynchronous frame in a transmission cycle; and
   a multiplexer for receiving a synchronous frame and an asynchronous frame from the synchronous queue and the scheduler, respectively, to transmit the synchronous frame and asynchronous frame in a form of a transmission cycle while strictly maintaining a starting point of a superframe;
   wherein said scheduler for determining whether there is remaining sufficient capacity for transmitting another first asynchronous frame with different or the same characteristics than said particular received first asynchronous frame in the transmission cycle and transmitting the particular received first asynchronous frame and said another first asynchronous frame when there is sufficient capacity to transmit said another first asynchronous frame with said different or the same characteristics and the particular received first asynchronous frame in a transmission cycle.

2. The Residential Ethernet node apparatus as claimed in claim 1, wherein the characteristics of said particular received first asynchronous frame and said another first asynchronous frame with different characteristics than said particular received first asynchronous frame include destination address (DA) information and source address (SA) information of the asynchronous frames.

3. The Residential Ethernet node apparatus as claimed in claim 1, wherein the asynchronous queue operates in a first-in-first-out (FIFO) scheme.

4. The Residential Ethernet node apparatus as claimed in claim 1, wherein the scheduler receives a plurality of first asynchronous frames sequentially across the plurality of asynchronous queues, and determines if each received asynchronous frame can be transmitted by comparing a size of each received asynchronous frame with a size of an available transmission region in the transmission cycle.

5. The Residential Ethernet node apparatus as claimed in claim 4, wherein the scheduler creates transmission failure information with respect to a corresponding asynchronous queue, to which a received asynchronous frame belongs, when it is not possible to transmit the received asynchronous frame.

6. The Residential Ethernet node apparatus as claimed in claim 5, wherein the scheduler schedules a transmission sequence of the asynchronous queues in a next transmission cycle according to a sequence created by the transmission failure information.

7. A Residential Ethernet node apparatus far maintaining a starting point of a superframe, comprising:
   a synchronous queue for receiving and temporarily storing synchronous data, in order to transmit the synchronous data by inserting the synchronous data into a transmission cycle;
   an asynchronous queue for receiving and storing asynchronous frames from an exterior source;
   a dispatcher for sequentially searching for the asynchronous frames in the asynchronous queue, and outputting an asynchronous frame which can be transmitted according to a size of an available transmission region; and
   a multiplexer, which receives a synchronous frame and an asynchronous frame from the synchronous queue and the dispatcher so as to transmit the synchronous frame and asynchronous frame in a form of a transmission cycle while maintaining a starting point of a superframe;
   wherein said dispatcher for determining whether there is remaining sufficient capacity for transmitting another first asynchronous frame with different or the same characteristics than said particular received first asynchronous frame in the transmission cycle and transmitting the particular received first asynchronous frame and said another first asynchronous frame when there is sufficient capacity to transmit said another first asynchronous frame with said different or the same characteristics and the particular received first asynchronous frame in a transmission, cycle.

8. A method for processing an asynchronous frame in a Residential Ethernet node apparatus which maintains a starting point of a superframe, the method comprising the steps of:
   a) receiving asynchronous frames from exterior sources;
   b) parsing the received asynchronous frames, and storing the parsed asynchronous frames in a plurality of queues according to characteristics of the parsed asynchronous frames, wherein each of the asynchronous queues having at least a first asynchronous frame for each respective characteristic parsed by the parser;
   c) receiving information about a size of each asynchronous frame to be first transmitted from the queues one by one, comparing the received size information with an available transmission region, and transmitting asynchronous frames that can be transmitted;
   d) creating transmission failure information with respect to a queue, an asynchronous frame of which cannot be transmitted; and
   e) providing an indication that no asynchronous frame is to be transmitted in a corresponding transmission cycle, when transmission failure information has been created with respect to each queue;
   wherein the receiving and comparing of the step c) includes determining whether there is remaining sufficient capacity for transmitting another first asynchronous frame with different or the same characteristics than said particular received first asynchronous frame in the transmission cycle and the transmitting of the step c) includes sending the particular received first asynchronous frame and said another first asynchronous frame when there is sufficient capacity to transmit said another first asynchronous frame with said different or the same characteristics and the particular received first asynchronous frame in a transmission cycle.

9. The method as claimed in claim 8, wherein, in step b), the characteristics of the asynchronous frames include destination address (DA) information and source address (SA) information of the asynchronous frames.

10. The method as claimed in claim 8, wherein the asynchronous queue operates in a first-in-first-out (FIFO) scheme.

11. The method as claimed in claim 8, wherein a transmission sequence in a next transmission cycle is scheduled according to a sequence created by the transmission failure information with respect to the asynchronous queues.

12. An apparatus for processing an asynchronous frame in a Residential Ethernet node apparatus which maintains a starting point of a superframe, the apparatus comprising:
 a processor in communication with a memory; the processor executing code for:
 receiving asynchronous frames from exterior sources;
 parsing the received asynchronous frames, and storing the parsed asynchronous frames in a plurality of queues according to characteristics of the parsed asynchronous frames, wherein each of the asynchronous queues having at least a first asynchronous frame for each respective characteristic parsed by the parser;
 receiving information about a size of each asynchronous frame to be first transmitted from the queues one by one, comparing the received size information with an available transmission region, and transmitting asynchronous frames that can be transmitted, wherein the receiving and comparing includes determining whether there is remaining sufficient capacity for transmitting another first asynchronous frame with different or the same characteristics than said particular received first asynchronous frame in the transmission cycle and the transmitting includes sending the particular received first asynchronous frame and said another first asynchronous frame when there is sufficient capacity to transmit said another first asynchronous frame with said different or the same characteristics and the particular received first asynchronous frame in a transmission cycle;
 creating transmission failure information with respect to a queue, an asynchronous frame of which cannot be transmitted; and
 providing an indication that no asynchronous frame is to be transmitted in a corresponding transmission cycle, when transmission failure information has been created with respect to each queue.

13. The apparatus as claimed in claim 12, wherein the characteristics of the asynchronous frames include destination address (DA) information and source address (SA) information of the asynchronous frames.

14. The apparatus as claimed in claim 12, wherein the asynchronous queue operates in a first-in-first-out (FIFO) scheme.

15. The apparatus as claimed in claim 12, wherein a transmission sequence in a next transmission cycle is scheduled according to a sequence created by the transmission failure information with respect to the asynchronous queues.

\* \* \* \* \*